(12) United States Patent
Bernat et al.

(10) Patent No.: US 11,095,755 B2
(45) Date of Patent: Aug. 17, 2021

(54) TELEMETRY FOR DISAGGREGATED RESOURCES

(71) Applicant: INTEL CORPORATION, Santa Clara, CA (US)

(72) Inventors: Francesc Guim Bernat, Barcelona (ES); Susanne M. Balle, Hudson, NH (US); Rahul Khanna, Portland, OR (US); Karthik Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 862 days.

(21) Appl. No.: 15/645,516

(22) Filed: Jul. 10, 2017

(65) Prior Publication Data

US 2019/0014193 A1  Jan. 10, 2019

(51) Int. Cl.
| | |
|---|---|
| *H04L 29/04* | (2006.01) |
| *H04L 29/08* | (2006.01) |
| *G06F 11/36* | (2006.01) |
| *H04L 12/24* | (2006.01) |

(52) U.S. Cl.
CPC ............ *H04L 67/34* (2013.01); *G06F 11/362* (2013.01); *H04L 41/5003* (2013.01); *H04L 67/26* (2013.01)

(58) Field of Classification Search
None
See application file for complete search history.

(56) References Cited

U.S. PATENT DOCUMENTS

| | | | | |
|---|---|---|---|---|
| 2012/0278378 | A1* | 11/2012 | Lehane | H04L 41/5051 709/201 |
| 2014/0026111 | A1* | 1/2014 | Stitt | G06F 17/17 717/101 |
| 2016/0378629 | A1* | 12/2016 | Gwozdz | G06F 11/3476 702/186 |
| 2017/0317893 | A1* | 11/2017 | Goldstein | H04L 41/5003 |
| 2018/0145923 | A1* | 5/2018 | Chen | G06F 9/5077 |
| 2018/0198840 | A1* | 7/2018 | Chandran | H04L 43/0852 |

\* cited by examiner

*Primary Examiner* — Cai Y Chen
(74) *Attorney, Agent, or Firm* — Patent Capital Group

(57) ABSTRACT

A host fabric interface (HFI), including: first logic to communicatively couple a host to a fabric; and second logic to provide a disaggregated telemetry engine (DTE) to: receive notification via the fabric of available telemetry data for a remote accelerator; allocate memory for handling the telemetry data; and receive the telemetry data from the disaggregated accelerator.

25 Claims, 13 Drawing Sheets

TELEMETRY FOR DISAGGREGATED RESOURCES

FIELD OF THE SPECIFICATION

This disclosure relates in general to the field of cloud computing, and more particularly, though not exclusively, to a system and method for telemetry for disaggregated resources.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
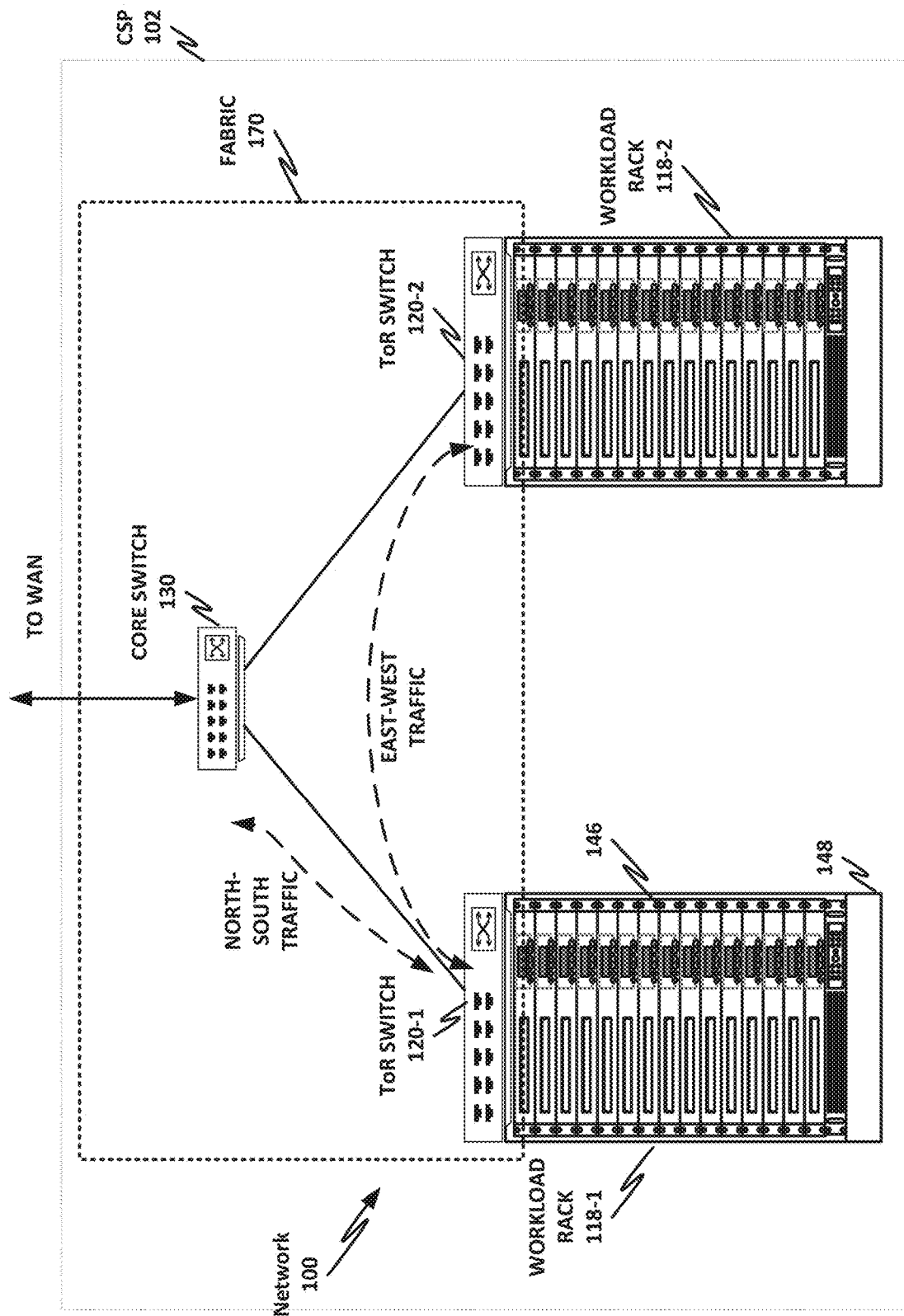
FIG. 1 is a network-level diagram of a cloud service provider (CSP), according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The concept of "debugging" a program has evolved as the nature of computing has changed in contexts such as high-performance computing (HPC) and data centers. While in a classical sense, "debugging" may have been in largely focused on ensuring that a program executes correctly, a process running in a large data center may have many other factors, such as quality of service (QoS), service level agreements (SLAs), customer perceived delay, and a host of optimizations.

One method of optimizing data center compute resources is to provide some resources in a so-called "sled," so that a collection of similar resources can be aggregated together and dynamically assigned to workloads in response to the evolving demands of the data center. Thus, a "node" in a data center may not be a single physical device, with a fixed allocation of processors, memory, accelerators, and other resources. Rather, a composite node may be defined, in which certain disaggregated resources are dynamically assigned to the composite node. For example, a data center orchestrator may assemble a composite node by first assigning a processor with memory, possibly assigning additional memory resources, such as in a dedicated memory server providing advanced memory such as Intel® 3-D Crosspoint™, may assign storage on a storage server, and may assign accelerators, such as one or more kernels executing on a properly configured FPGA. The physical resources for this composite node may be located on several different physical devices connected by a data center fabric, such as an Intel® Omni-Path™ architecture (OPA), or other system for connecting a number of computer systems to form a network, such as Ethernet.

The various assets assigned to a composite node may communicate with each other via a fabric, and may each have a host fabric interface (HFI). Advantageously, the HFI may provide abstraction layers that enable the various components to communicate as though they were collocated in a single physical device. Thus, a program running on the processor of the composite node need not have direct visibility into an accelerator, such as an accelerated function provided by a kernel executing on an FPGA. The program may access this accelerator via function calls that are mapped by the HFI to its local address space, and may receive results in a similar fashion.

This greatly simplifies and enhances portability of programs that are designed for running in a data center. It also enables legacy software that may be difficult to modify to be able to run in a data center.

In this context, debugging may take on various new dimensions. In some examples, it is not sufficient to merely ensure that the program operation is theoretically correct. Rather, to ensure that the program does not become a bottleneck in the data center, and to ensure that other requirements are met, such as QoS factors or SLAs, it may be necessary to ensure that sufficient resources and bandwidth are allocated to the various disaggregated resources in the composite node.

Thus, while the invisibility of a resource such as an FPGA is advantageous in the sense of abstraction, simplicity, and portability, it can become a challenge in terms of debugging. For example, if a particular accelerator becomes a bottleneck to performance because insufficient bandwidth or other resources have been allocated to it, it may be difficult to determine this from behind one or more layers of abstraction.

To preserve the concept of abstraction, while also exposing certain performance counters that are useful in debugging data center, HPC, or other applications, the present specification discloses a system and method for disaggregated telemetry, wherein disaggregated resources (such as an FPGA accelerator) are able to expose certain performance counters via their HFIs, so that software running on a composite node can be used to debug an application for use in the data center.

Such debugging can be a useful tool in understanding, characterizing, and analyzing systems, including root cause analysis. Performance counter-based monitoring in this context is a particularly useful tool in debugging and monitoring very large and complex systems such as data centers and HPC computing.

Existing FPGA architectures may include technologies such as FPGA toolkits that provide debug and monitoring capabilities for the FPGAs. In addition to these, there can be provided performance counter mechanisms that are comprehensive and that integrate with a compute node such as a composite node including many disaggregated resources. FPGA debugging capabilities may include, by way of nonlimiting example:

FPGA resources. Most current FPGAs provide a mechanism to access a set of predefined performance counters through specific tools and methods.

Many FPGA companies also provide a set of simulation tools that can be used before deployment to characterize and understand kernels that will run on the FPGA.

The disaggregated telemetry architecture of the present specification extends these capabilities, particularly in the context of FPGAs residing in distributed sleds. By way of nonlimiting example, this architecture provides the following:

End-to-end telemetry data. When FPGAs reside in an FPGA sled connected to the compute sled through a set of potentially shared resources (such as a local HFI, fabric, and shared memory), the architecture provides operations to monitor the resources. This allows a debugger to detect when problems are caused by end-to-end connections between disaggregated FPGAs, or other disaggregated resources. Note that this may include the FPGA's usage of other disaggregated resources, such as disaggregated memory or storage.

Access to FPGA telemetry data. Because FPGAs may reside relatively far from the processor of the compute node accessing them, the architecture provides interfaces for programs running on the composite node to access FPGA resources as though the FPGA were placed locally in the platform.

Operations for an FPGA kernel to publicize specific metrics. This may include access to performance monitors or other resources beyond standard performance counters such as memory bandwidth usage. This enables more detailed debugging of bottlenecks specific to the FPGA, and specific to how software running on the processor is using and interacting with the FPGA. These extended performance monitors may include FPGA-specific events that can be defined by the application with respect to its particular usage.

Access to telemetry data on a composite node basis. This provides telemetry data on a basis that is specific to the composite node running the application. In the case of software defined infrastructure (SDI), virtualized resources residing in remote sleds may be exposed as local resources in the compute sled as a traditional hardware platform would do. In the case of a composite node, the resources may be physically disaggregated among various places in the data center, but it is beneficial to enable resources to debug applications as though those disaggregated resources were physically collocated.

The disaggregated telemetry architecture of the present specification provides a complete telemetry model for disaggregated resources such as FPGAs. This includes in certain embodiments end-to-end telemetry data that enables a debugger or system programmer to understand bottlenecks and to be able to access remote FPGAs. This can also provide kernel-specific metrics that enable a programmer to understand execution of a kernel on the FPGA and to analyze a processor's in situ use of the FPGA kernel. This provides greater real insight than may be realized in a simulation-only architecture.

The disaggregated telemetry architecture also enables a system programmer to understand kernel-specific events that may be custom defined for a particular FPGA kernel. These specific events may be preregistered and invoked when the specific kernel is used.

This architecture also enables observation and monitoring of the kernel from the CPU side, where control flow for execution occurs. Thus, in response to registered events or performance monitors, corrective action may be taken on the CPU side, where the action is local to the hardware platform.

The architecture enables monitoring of telemetry data on a per composite node basis. This enables the architecture to provide data that account for applications running in that particular composite node.

The architecture further provides dynamic methods to modify and interact with telemetry residing on the disaggregated resource, such as an FPGA. Registration and invocation of specific counters may be dynamic at run time, and interfaces and circuitry may be provided to handle this use case.

Embodiments of the disaggregated telemetry architecture of the present specification may be provided in one example as an extension of existing SDI architecture and platform architecture. To realize this extension, embodiments of the architecture may include the following elements, by way of nonlimiting example:

A comprehensive SDI FPGA monitoring data model.

Novel hardware elements to allow applications monitoring kernel execution and related end-to-end resources as they are directly attached to the hardware platform.

Novel FPGA interfaces to the kernels to expose specific performance counters to the applications running in the composite node.

Facilities for applications being executed in a composite node to monitor kernels and associated resources as though those kernels were running in the same processor as a regular process.

A system and method for telemetry for disaggregated resources will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a network 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS).

CSP 102 may provision some number of workload racks 118, which may be racks of individual servers, blade servers, rackmount servers, or any other suitable server topology. In this illustrative example, two workload racks, 118-1 and 118-2 are shown, each providing rackmount servers 146 in a chassis 148.

In this illustration, workload racks 118 are shows as modular workload racks conforming to the rack unit ("U") standard, in which a standard rack, 19 inches wide, may be built to accommodate 42 units (42U), each 1.75 inches high and approximately 36 inches deep. In this case, compute resources such as processors, memory, storage, accelerators, and switches may fit into some multiple of rack units from one to 42.

Figure 4:
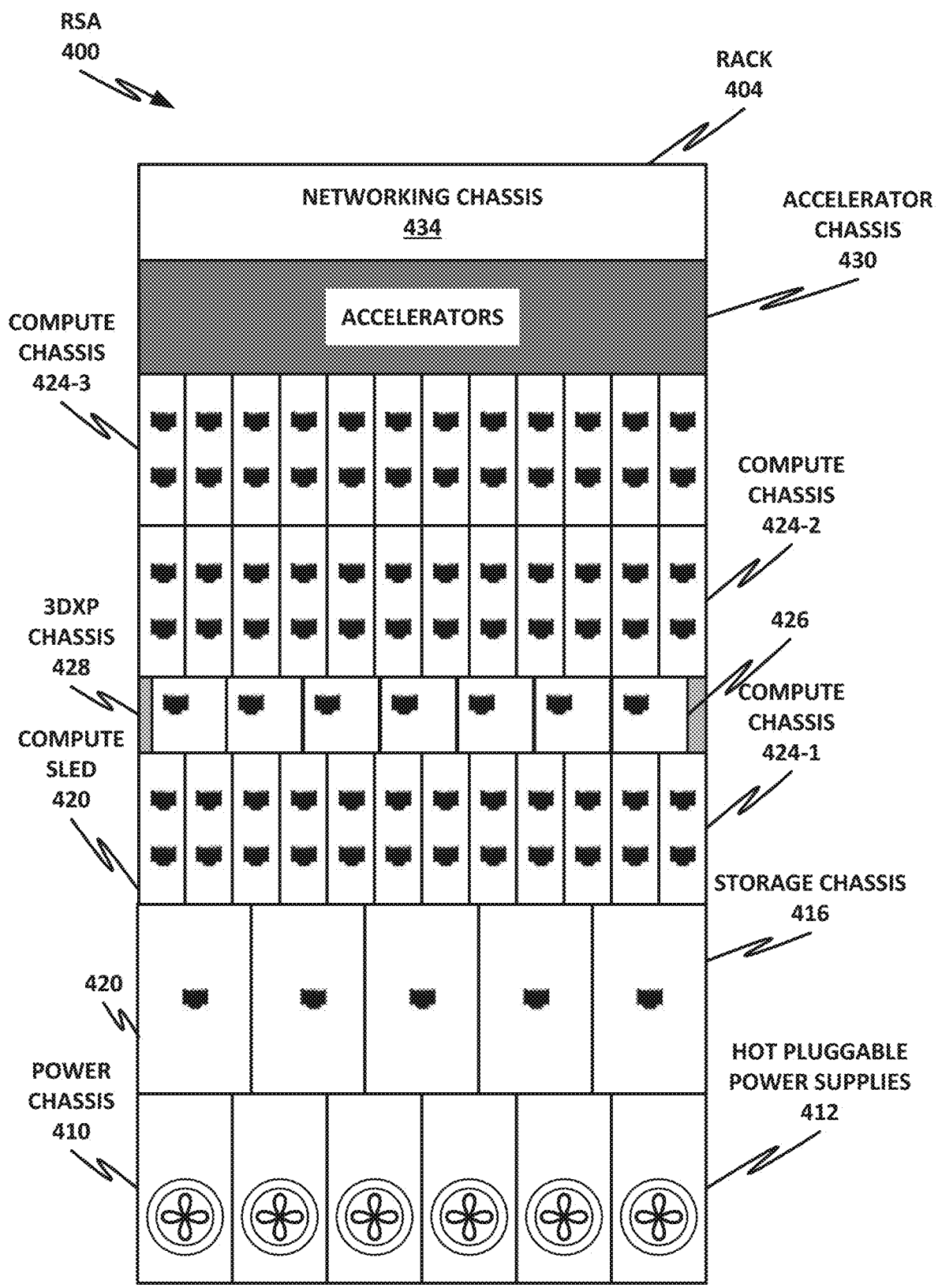
FIG. 4 is a block diagram of a rack scale architecture according to one or more examples of the present specification.

However, other embodiments are also contemplated. For example, FIG. 4 illustrates a resource sled. While the resource sled may be built according to standard rack units (e.g., a 3U resource sled), it is not necessary to do so in a so-called "rack scale" architecture. In that case, entire prepopulated racks of resources may be provided as a unit, with the rack hosting a plurality of compute sleds, which may or may not conform to the rack unit standard (particularly in height). In those cases, the compute sleds may be considered "line replaceable units" (LRUs). If a resource fails, the sled hosting that resource can be pulled, and a new sled can be modularly inserted. The failed sled can then be repaired or discarded, depending on the nature of the failure. Rack scale architecture is particularly useful in the case of software-defined infrastructure (SDI), wherein composite nodes may be built from disaggregated resources. Large resource sleds can be provided, and an SDI orchestrator may allocate them to composite nodes as necessary.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include an Intel® HFI, a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such as where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® Omni-Path™, TrueScale™, Ultra Path Interconnect (UPI) (formerly called QPI or KTI), FibreChannel, Ethernet, Fibre-Channel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as Omni-Path™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting. In certain embodiments, elements of network 100 may be adapted or configured to operate with the disaggregated telemetry model of the present specification.

Figure 2:
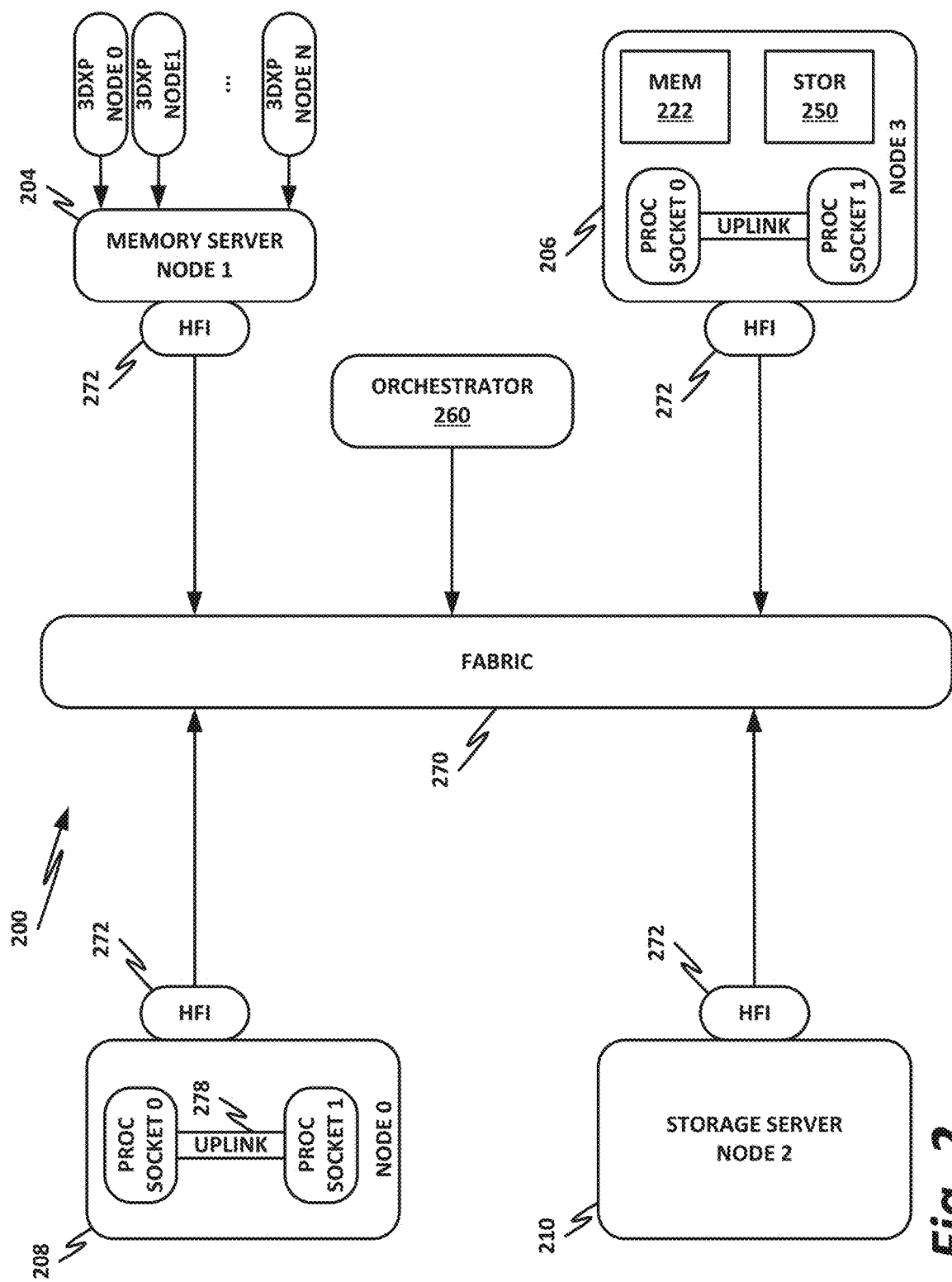
FIG. 2 is a block diagram of a data center, according to one or more examples of the present specification.

FIG. 2 is a block diagram of a data center 200 according to one or more examples of the present specification. Data center 200 may be, in various embodiments, the same as network 100 of FIG. 1, or may be a different data center. Additional views are provided in FIG. 2 to illustrate different aspects of data center 200.

In this example, a fabric 270 is provided to interconnect various aspects of data center 200. Fabric 270 may be the same as fabric 170 of FIG. 1, or may be a different fabric. As above, fabric 270 may be provided by any suitable interconnect technology. In this example, Intel® Omni-Path™ is used as an illustrative and nonlimiting example.

As illustrated, data center 200 includes a number of logic elements that can be logically arranged to form a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via an HFI 272. HFI 272 may connect to an Intel® Omni-Path™ fabric. In some examples, communication with fabric 270 may be tunneled, such as by providing UPI tunneling over Omni-Path™.

Because data center 200 may provide many functions in a distributed fashion that in previous generations were provided onboard, a highly capable HFI 272 may be provided. HFI 272 may operate at speeds of multiple gigabits per second, and in some cases may be tightly coupled with node 0 208. For example, in some embodiments, the logic for HFI 272 is integrated directly with the processors on a system-on-a-chip. This provides very high speed communication between HFI 272 and the processor sockets, without the need for intermediary bus devices, which may introduce additional latency into the fabric. However, this is not to imply that embodiments where HFI 272 is provided over a traditional bus are to be excluded. Rather, it is expressly anticipated that in some examples, HFI 272 may be provided on a bus, such as a PCIe bus, which is a serialized version of PCI that provides higher speeds than traditional PCI. Throughout data center 200, various nodes may provide different types of HFIs 272, such as onboard HFIs and plug-in HFIs. It should also be noted that certain blocks in a system on a chip may be provided as intellectual property (IP) blocks that can be "dropped" into an integrated circuit as a modular unit. Thus, HFI 272 may in some cases be derived from such an IP block.

Node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large sled of high-speed or specialized memory may be dynamically provisioned between a number of nodes, so that each node has access to a large sled of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a HFI 272, which provides fast communication that makes these technologies possible.

By way of further illustration, node 3 206 is also depicted. Node 3 206 also includes a HFI 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

A data center 200 may also be extended with rack scale architecture functionality, such as an Intel® data center rack hosting one or more resource sleds. Such resource sleds are described in more detail in connection with FIG. 4. The creation of composite nodes using resource sleds is described in additional detail in connection with FIG. 5.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor. In certain embodiments, elements of data center 200 may be adapted or configured to operate with the disaggregated telemetry model of the present specification.

Figure 3:
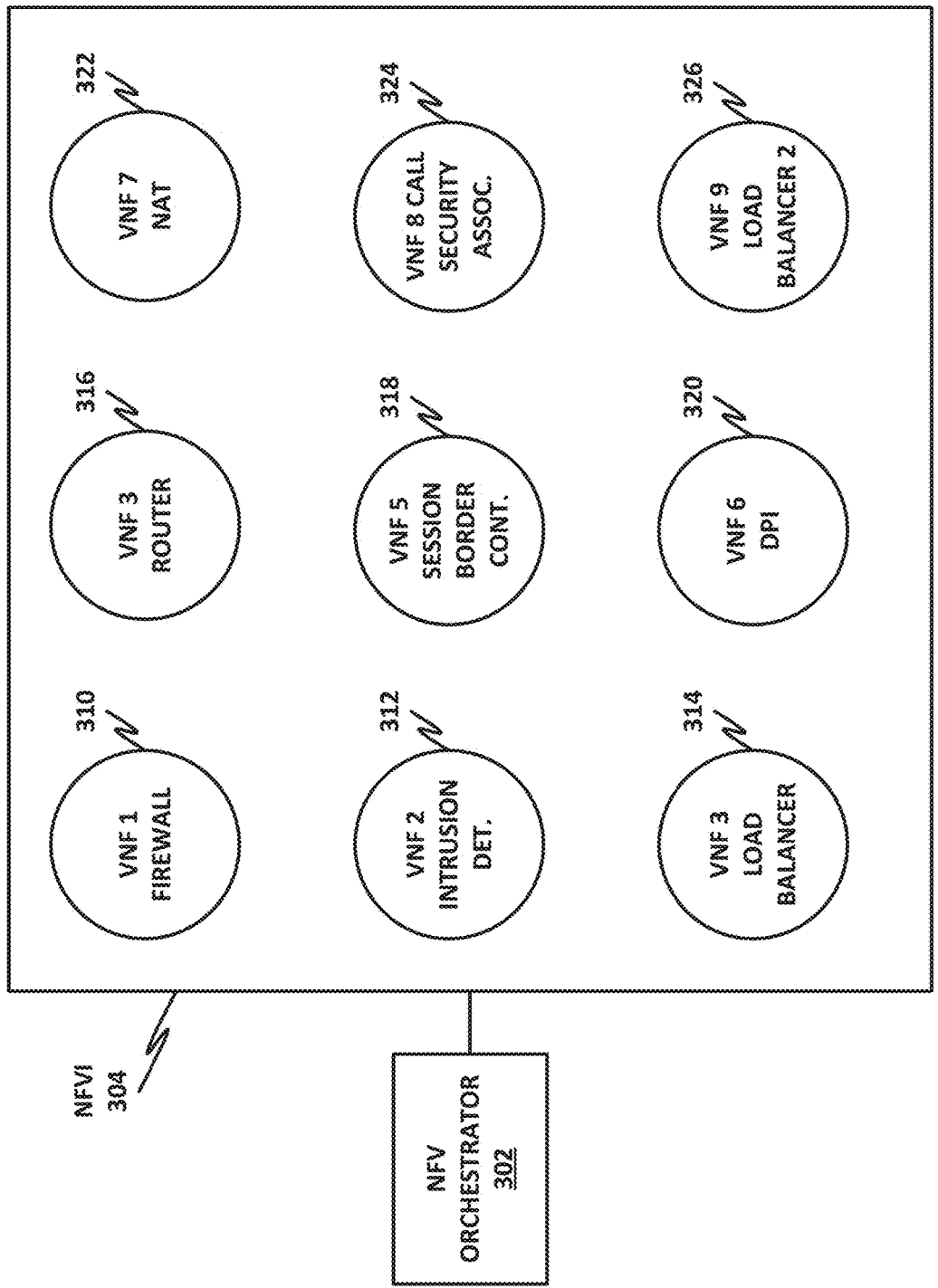
FIG. 3 is a block diagram of a network function virtualization (NFV) architecture, according to one or more examples of the present specification.

FIG. 3 is a block diagram of a network function virtualization (NFV) architecture according to one or more examples of the present specification. NFV is a second nonlimiting flavor of network virtualization, often treated as an add-on or improvement to SDN, but sometimes treated as a separate entity. NFV was originally envisioned as a method for providing reduced capital expenditure (Capex) and operating expenses (Opex) for telecommunication services. One important feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancer VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI). Often, the VNFs are inline service functions that are separate from workload servers or other nodes. These VNFs can be chained together into a service function chain, which may be defined by a virtual subnetwork, and which may include a serial string of network services that provide behind-the-scenes work, such as security, logging, billing, and similar.

The illustration of this in FIG. 3 may be considered more functional, compared to more high-level, logical network layouts. Like SDN, NFV is a subset of network virtualization. In other words, certain portions of the network may rely on SDN, while other portions (or the same portions) may rely on NFV.

In the example of FIG. 3, an NFV orchestrator 302 manages a number of the VNFs running on an NFVI 304. NFV requires nontrivial resource management, such as allocating a very large sled of compute resources among appropriate numbers of instances of each VNF, managing connections between VNFs, determining how many instances of each VNF to allocate, and managing memory, storage, and network connections. This may require complex software management, thus the need for NFV orchestrator 302.

Note that NFV orchestrator 302 itself is usually virtualized (rather than a special-purpose hardware appliance). NFV orchestrator 302 may be integrated within an existing SDN system, wherein an operations support system (OSS) manages the SDN. This may interact with cloud resource management systems (e.g., OpenStack) to provide NFV orchestration. An NFVI 304 may include the hardware, software, and other infrastructure to enable VNFs to run. This may include a rack or several racks of blade or slot servers (including, e.g., processors, memory, and storage), one or more data centers, other hardware resources distributed across one or more geographic locations, hardware switches, or network interfaces. An NFVI 304 may also include the software architecture that enables hypervisors to run and be managed by NFV orchestrator 302. Running on NFVI 304 are a number of virtual machines, each of which in this example is a VNF providing a virtual service appliance. These include, as nonlimiting and illustrative examples, VNF 1 310, which is a firewall, VNF 2 312, which is an intrusion detection system, VNF 3 314, which is a load balancer, VNF 4 316, which is a router, VNF 5 318, which is a session border controller, VNF 6 320, which is a deep packet inspection (DPI) service, VNF 7 322, which is a network address translation (NAT) module, VNF 8 324, which provides call security association, and VNF 9 326, which is a second load balancer spun up to meet increased demand.

Firewall 310 is a security appliance that monitors and controls the traffic (both incoming and outgoing), based on matching traffic to a list of "firewall rules." Firewall 310 may be a barrier between a relatively trusted (e.g., internal) network, and a relatively untrusted network (e.g., the Internet). Once traffic has passed inspection by firewall 310, it may be forwarded to other parts of the network.

Intrusion detection 312 monitors the network for malicious activity or policy violations. Incidents may be reported to a security administrator, or collected and analyzed by a security information and event management (SIEM) system. In some cases, intrusion detection 312 may also include antivirus or antimalware scanners.

Load balancers 314 and 326 may farm traffic out to a group of substantially identical workload servers to distribute the work in a fair fashion. In one example, a load balancer provisions a number of traffic "buckets," and assigns each bucket to a workload server. Incoming traffic is assigned to a bucket based on a factor, such as a hash of the source IP address. Because the hashes are assumed to be fairly evenly distributed, each workload server receives a reasonable amount of traffic.

Router 316 forwards packets between networks or subnetworks. For example, router 316 may include one or more ingress interfaces, and a plurality of egress interfaces, with each egress interface being associated with a resource, subnetwork, virtual private network, or other division. When traffic comes in on an ingress interface, router 316 determines what destination it should go to, and routes the packet to the appropriate egress interface.

Session border controller 318 controls voice over IP (VoIP) signaling, as well as the media streams to set up, conduct, and terminate calls. In this context, "session" refers to a communication event (e.g., a "call"). "Border" refers to a demarcation between two different parts of a network (similar to a firewall).

DPI appliance 320 provides deep packet inspection, including examining not only the header, but also the content of a packet to search for potentially unwanted content (PUC), such as protocol non-compliance, malware, viruses, spam, or intrusions.

NAT module 322 provides network address translation services to remap one IP address space into another (e.g., mapping addresses within a private subnetwork onto the larger internet).

Call security association 324 creates a security association for a call or other session (see session border controller 318 above). Maintaining this security association may be critical, as the call may be dropped if the security association is broken.

The illustration of FIG. 3 shows that a number of VNFs have been provisioned and exist within NFVI 304. This figure does not necessarily illustrate any relationship between the VNFs and the larger network. In certain embodiments, elements of NFV orchestrator 302 may be adapted or configured to operate with the disaggregated telemetry model of the present specification.

FIG. 4 is a block diagram of a rack scale architecture 400 according to one or more examples of the present specification. In this example, RSA 400 includes a single rack 404, to illustrate certain principles of RSD. It should be understood that RSA 400 may include many such racks, and that the racks need not be identical to one another. In some cases a multipurpose rack such as rack 404 may be provided, while in other examples, single-purpose racks may be provided. For example, rack 404 may be considered a highly inclusive rack that includes resources that may be used to allocate a large number of composite nodes. On the other hand, other examples could include a rack dedicated solely to compute sleds, storage sleds, memory sleds, and other resource types, which together can be integrated into composite nodes. Thus, rack 404 of FIG. 4 should be understood to be a nonlimiting example of a rack that may be used in an RSA 400.

In the example of FIG. 4, rack 404 may be a standard rack with an external width of approximately 23.6 inches and a height of 78.74 inches. In common usage, this is referred to as a "42U rack." However, rack 404 need not conform to the "rack unit" standard. Rather, rack 404 may include a number of chassis that are optimized for their purposes.

Rack 404 may be marketed and sold as a monolithic unit, with a number of line replaceable units (LRUs) within each chassis. The LRUs in this case may be sleds, and thus can be easily swapped out when a replacement needs to be made.

In this example, rack 404 includes a power chassis 410, a storage chassis 416, three compute chassis (424-1, 424-2, and 424-3), a 3-D Crosspoint™ (3DXP) chassis 428, an accelerator chassis 430, and a networking chassis 434. Each chassis may include one or more LRU sleds holding the appropriate resources. For example, power chassis 410 includes a number of hot pluggable power supplies 412, which may provide shared power to rack 404. In other embodiments, some sled chassis may also include their own power supplies, depending on the needs of the embodiment.

Storage chassis 416 includes a number of storage sleds 420. Compute chassis 424 each contain a number of compute sleds 420. 3DXP chassis 428 may include a number of 3DXP sleds 426, each hosting a 3DXP memory server. And accelerator chassis 430 may host a number of accelerators, such as Intel® Quick Assist™ technology (QAT), FPGAs, ASICs, or other accelerators of the same or different types. Accelerators within accelerator chassis 430 may be the same type or of different types according to the needs of a particular embodiment.

Over time, the various LRUs within rack 404 may become damaged, outdated, or may experience functional errors. As this happens, LRUs may be pulled and replaced with compatible LRUs, thus allowing the rack to continue full scale operation.

Figure 5:
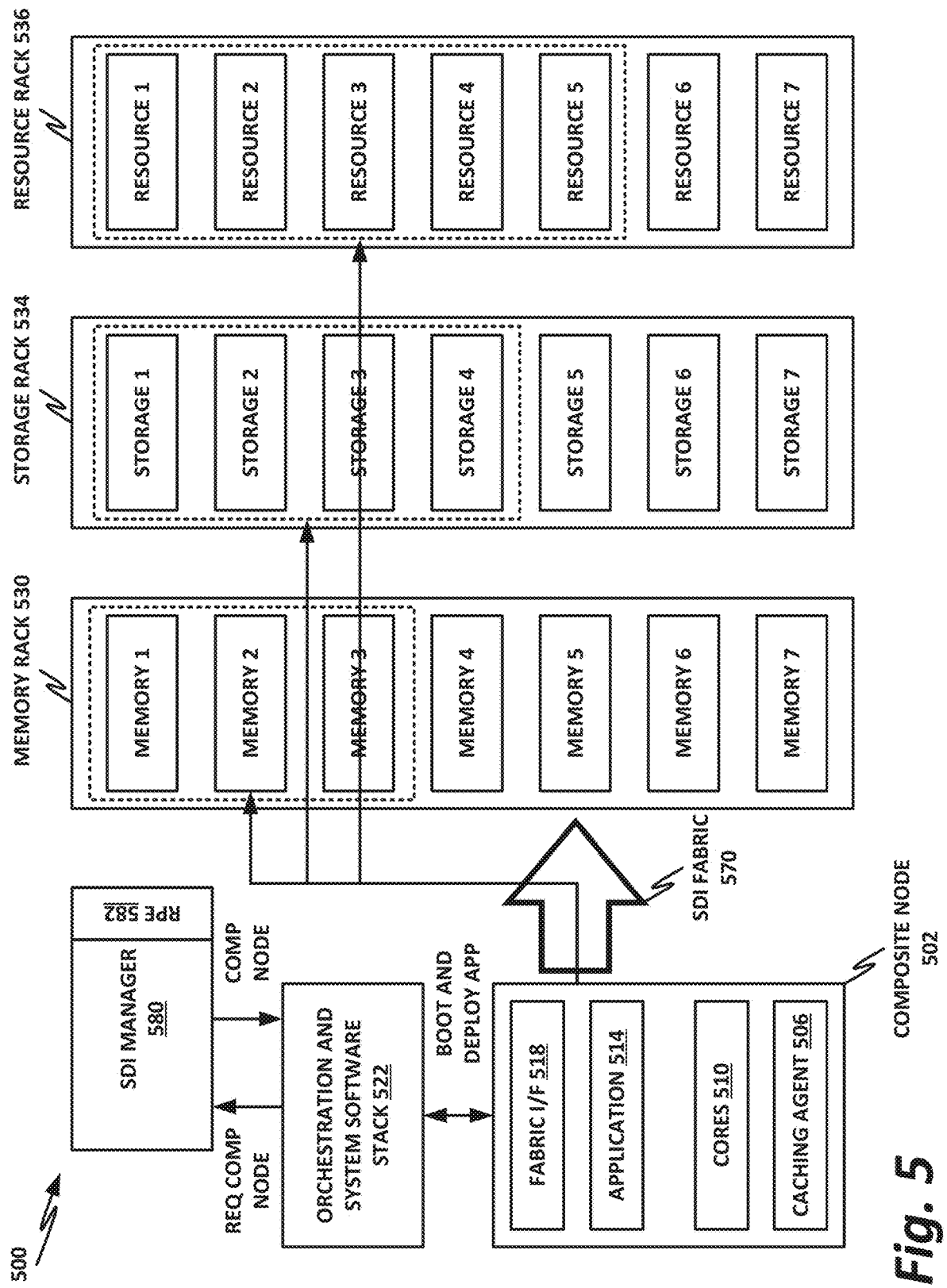
FIG. 5 is a block diagram of a software-defined infrastructure (SDI) data center, according to one or more examples of the present specification.

FIG. 5 is a block diagram of an SDI data center 500, according to one or more examples of the present specification. Certain applications hosted within SDI data center 500 may employ a set of resources to achieve their designated purposes, such as processing database queries, serving web pages, or providing computer intelligence.

Certain applications tend to be sensitive to a particular subset of resources. For example, a SAP HANA database may use processors, memory, disk, and fabric, while being most sensitive to memory and processors. In one embodiment, composite node 502 includes one or more cores 510 that perform the processing function. Node 502 may also include caching agents 506 that provide access to high-speed cache. One or more applications 514 run on node 502, and communicate with the SDI fabric via HFI 518. Dynamically provisioning resources to node 502 may include selecting a set of resources and ensuring that the quantities and qualities provided meet required performance indicators, such as SLAs and QoS. Resource selection and allocation for application 514 may be performed by a resource manager, which may be implemented within orchestration and system software stack 522. By way of nonlimiting example, throughout this specification the resource manager may be treated as though it can be implemented separately or by an orchestrator. Note that many different configurations are possible.

In an SDI data center, applications may be executed by a composite node such as node 502 that is dynamically allocated by SDI manager 580. Such nodes are referred to as composite nodes because they are not nodes where all of the resources are necessarily collocated. Rather, they may include resources that are distributed in different parts of the data center, dynamically allocated, and virtualized to the specific application 514.

In this example, memory resources from three memory sleds from memory rack 530 are allocated to node 502, storage resources from four storage sleds from storage rack 534 are allocated, and additional resources from five resource sleds from resource rack 536 are allocated to application 514 running on composite node 502. All of these resources may be associated to a particular compute sled and aggregated to create the composite node. Once the composite node is created, the operating system may be booted in node 502, and the application may start running using the aggregated resources as if they were physically collocated resources. As described above, HFI 518 may provide certain interfaces that enable this operation to occur seamlessly with respect to node 502.

As a general proposition, the more memory and compute resources that are added to a database processor, the better throughput it can achieve. However, this is not necessarily true for the disk or fabric. Adding more disk and fabric bandwidth may not necessarily increase the performance of the SAP HANA database beyond a certain threshold.

SDI data center 500 may address the scaling of resources by mapping an appropriate amount of offboard resources to the application based on application requirements provided by a user or network administrator or directly by the application itself. This may include allocating resources from various resource racks, such as memory rack 530, storage rack 534, and resource rack 536.

In an example, SDI controller 580 also includes a resource protection engine (RPE) 582, which is configured to assign permission for various target resources to disaggregated compute resources (DRCs) that are permitted to access them. In this example, the resources are expected to be enforced by an HFI servicing the target resource.

In certain embodiments, elements of SDI data center 500 may be adapted or configured to operate with the disaggregated telemetry model of the present specification.

Figure 6:
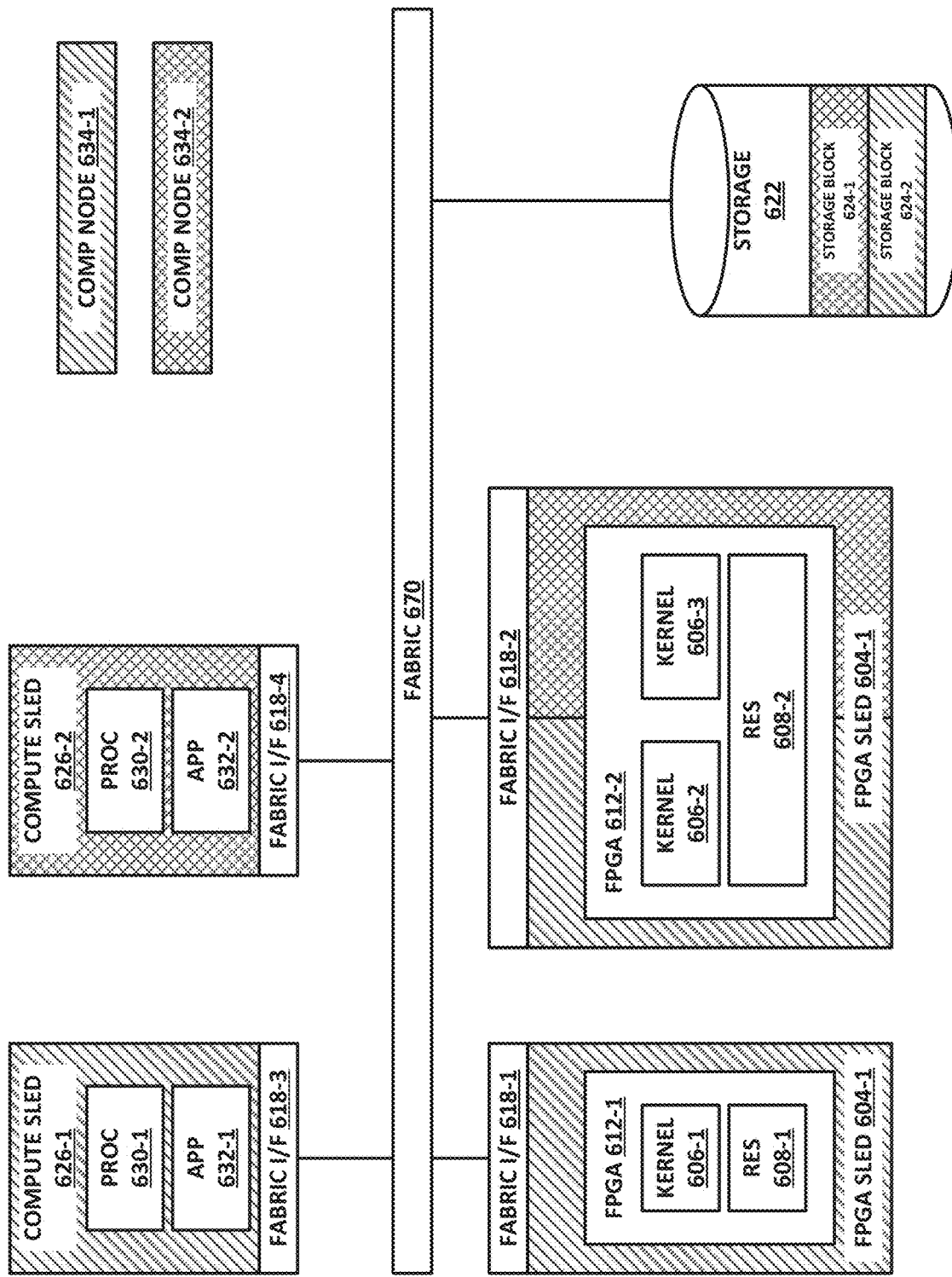
FIG. 6 is a block diagram of a data center, according to one or more examples of the present specification.

FIG. 6 is a block diagram of a data center 600 according to one or more examples of the present specification. In the example of FIG. 6, two composite nodes, namely composite node 634-1 and composite node 634-2 are defined.

Data center 600 includes a number of resources that may be disaggregated and that may be defined as part of a composite node according to the teachings of the present specification. For example, compute sleds 626-1 and 626-2 each include a processor, respectively 630-1 and 630-2. Each processor 630 may host a respective application, 632-1 and 632-2.

Note that in various embodiments, compute sleds 626-1 may also provide local memory, storage, accelerators, or other resources for processor 630-1. However, in accordance with the SDI teachings of the present specification, certain resources assigned to composite nodes 634 may also be disaggregated, or physically remote from processors 630. In this example, each composite node 634 has assigned to it one or more FPGAs 612 residing in FPGA sleds 604. These FPGAs may provide an accelerated function operating at near hardware speeds, and provided by a kernel 606. Each FPGA 612 may also have access to certain local FPGA resources 608. Composite node 634 may also have access to storage blocks 624 within storage sled 622. Storage 622 may also be a disaggregated resource provided in a resource sled.

It should be noted that, for simplicity and clarity of the illustration, only selected components are disclosed in this illustration. However, other disaggregated resources may also be provided. For example, data center 600 may include a memory server providing disaggregated memory, including persistent fast memory, which composite nodes 634 may access via remote direct memory access (RDMA).

In this example, composite node 634-1 includes processor 630-1 on compute sled 626-1, running application 632-1, and accessing fabric 670 via HFI 618-3. Composite node 634-1 also includes FPGA 612-1 running on FPGA sled 604-1, running FPGA kernel 606-1, and having access to FPGA resources 608-1. FPGA sled 604-1 may access fabric 670 via HFI 618-1. Note that in this example, a plurality of FPGAs on FPGA sled 604-1 may be connected to one another via a passive backplane, and a single HFI 618-1 may be provided for the entire sled. Composite node 634-1 may also have access to storage block 624-1 on storage sled 622. Within FPGA sled 604-2, FPGA 612-2 has access to a shared resource 608-2, which is accessed by two different kernels, kernel 606-2 and kernel 606-3. Kernel 606-2 on FPGA 612-1 is also assigned to composite node 634-1, while kernel 606-3 is not.

Composite node 634-2 includes processor 630-2 running application 632-2 on compute sled 626-2. Compute sled 626-2 connects to fabric 670 via HFI 618-4. Note that compute sleds 626 may also include a number of processors, memory, and other local resources that may be communicatively coupled to one another via a passive backplane, and share a common HFI 618. Composite node 634-2 also includes kernel 606-3 running on shared FPGA 612-2, and having access to shared resource 608-2. Composite node 634-2 may store data on storage block 624-2.

Figure 7:
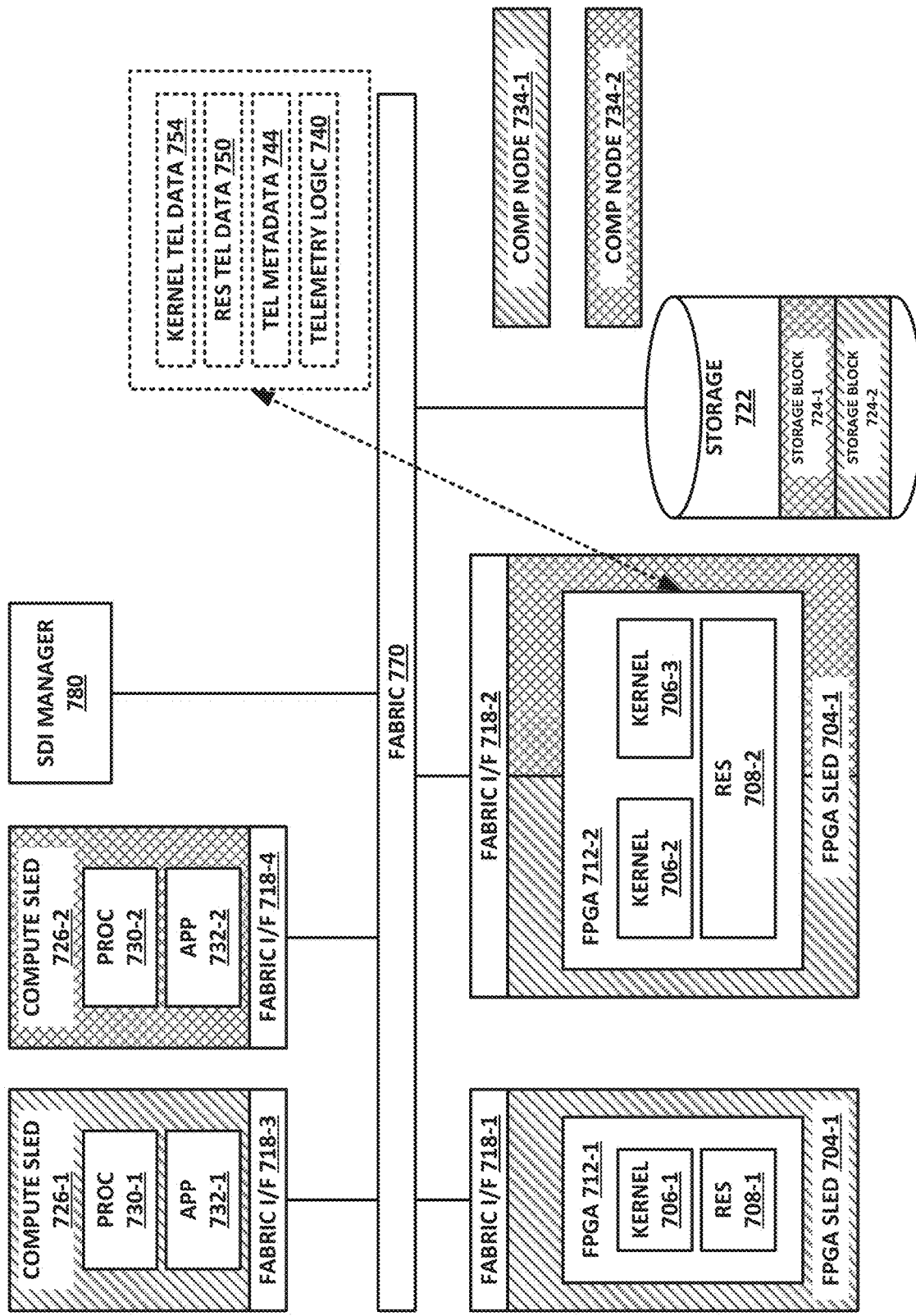
FIG. 7 is a block diagram of a data center that is substantially similar to that of FIG. 6, according to one or more examples of the present specification.

FIG. 7 is a block diagram of a data center 700 that is substantially similar in many respects to data center 600. In this example, data center 700 includes composite nodes 734-1 and 734-2. Composite node 734-1 also includes processor 730-1 running application 732-1 on compute sled 726-1. Compute sled 726-1 accesses fabric 770 via HFI 718-3. Composite node 734-1 also includes FPGA 712-1 running kernel 706-1 with resource 708-1 on FPGA sled 704-1. FPGA sled 704-1 may be a compute sled or an FPGA sled that accesses fabric 770 via HFI 718-1. Composite node 734-1 also includes a single kernel 706-2 running on FPGA 712-2 of FPGA sled 704-2. FPGA sled 704-2 accesses fabric 770 via HFI 718-2. Composite node 734-2 includes compute sled 726-2 with processor 730-2 running application 732-2. Compute sled 726-2 accesses fabric 770 via HFI 718-4.

Composite node 734-2 also includes a kernel 706-3 running on shared FPGA 712-2, and accessing a shared resource 708-2. Composite node 734-2 may access storage block 724-1.

Data center 700 also includes an SDI manager 780, which may be configured to provide certain extended SDI functionality.

In data center 700, SDI manager 780 extends the SDI architecture with a set of end-to-end monitoring elements that provide telemetry data for disaggregated resources such as FPGAs 712 located within FPGA sleds 704. In various embodiments, the telemetry data may include, by way of nonlimiting example, kernel telemetry data 754, which applies to kernels 706, resource telemetry data 750, which applies to resources 708, telemetry metadata 744, which provides metadata related to the other telemetry provided, and telemetry logic 740, which provides the driving logic for providing telemetry as described herein.

The extended SDI architecture provides telemetry data for those data center resources that participate in communication between a compute sled 726 and an FPGA 706, and from an FPGA 706 to other data center resources, such as disaggregated storage 722. Each telemetry datum may account for resource usage by the composite node, abstracting away from the actual usage of other composite nodes in the data center 700. For example, kernel 706-2 is assigned to composite node 734-1, while kernel 706-3 is assigned to composite node 734-2. Both kernels share access to resource 708-2. Thus, resource telemetry data 750 for kernel 706-2 may account only for resource usage by that kernel, and not for usage of resource 708-2 by kernel 706-3.

In various embodiments, FPGAs 712 may also be extended with a novel performance monitoring table, wherein each kernel can register a number of performance counters, i.e., kernel telemetry data 754, as well as telemetry metadata 744. This table may be controlled by telemetry logic 740 within FPGA 712, to which kernels 706 may register new performance counters, as well as the values for those performance counters, once the kernel starts running.

Monitoring elements within the compute sled may be responsible to update the compute sled memory based on a configuration (for example, update counters every n cycles, or in an overflow event). Monitoring elements may also update compute sled performance counters with monitoring data. In another embodiment, a different entity providing access to the telemetry data, such as SDI manager 780, may also drive updates. In some embodiments, applications 732 running on the composite node may access, as necessary, the monitoring information using existing performance data.

FPGA 712-1 may provide access to the compute sled of FPGA sled 704 to telemetry metadata 744 stored in its table so that the compute sled can discover which counters are exposed, what they contain, and how they will be updated. Security may also be considered, such as exposing counters as well as metadata to processes with corresponding rights.

In some embodiments, SDI manager 780 exposes interfaces to the compute sled and software stack to discover which counters are exposed, what they contain, and how they will be updated for each of the shared resources.

Figure 8:
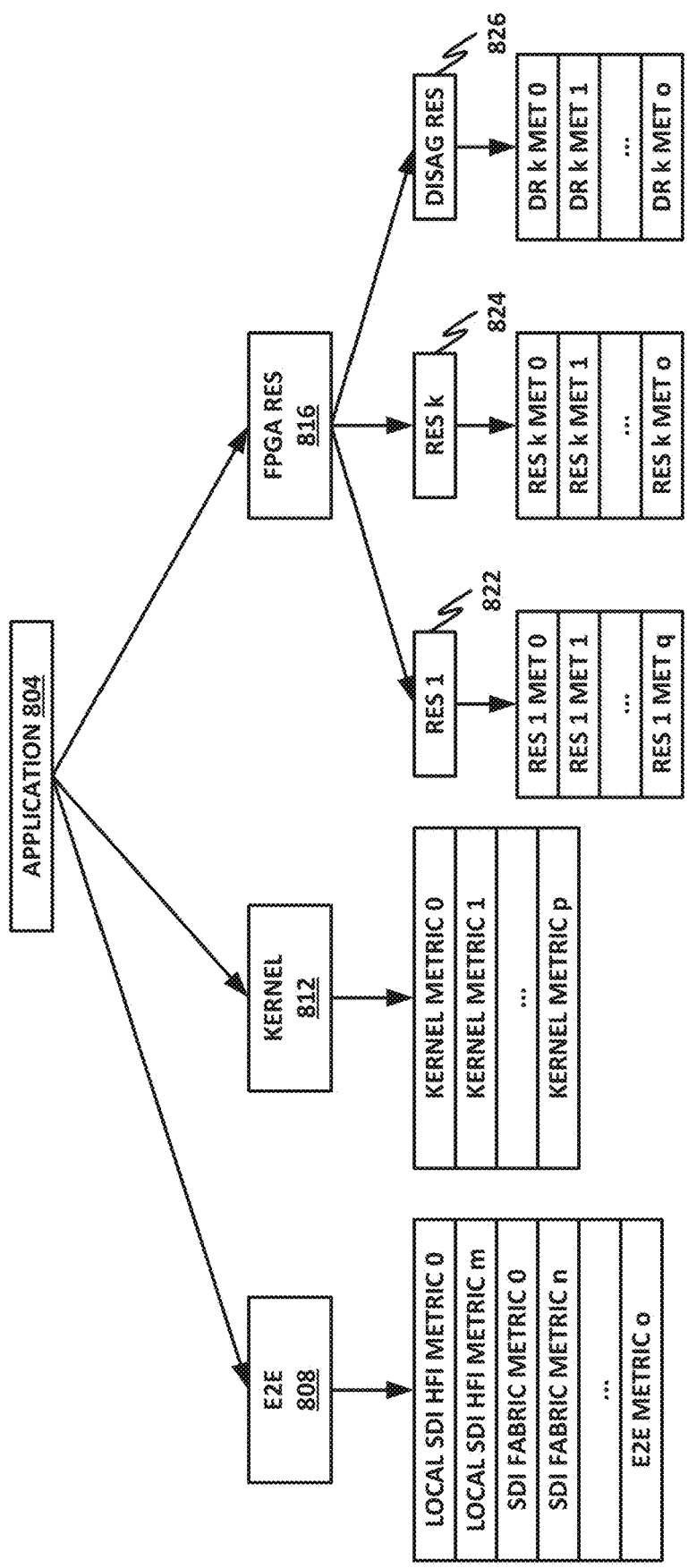
FIG. 8 is a block diagram of a communications model for a data center, which may include SDI functionality, according to one or more examples of the present specification.

In some embodiments, the compute sled architecture may also be extended with a set of performance monitoring counters per kernel, and with a number of supported kernels, to expose the performance counters exposed by the application. These may be numbered according to the kernel and the performance monitor, as illustrated in FIG. 8. A set of fixed, model-specific registers (MSRs) may also expose a dynamic counter metadata so that applications can discover how many performance counters the kernel exposes, what they are, and how they are updated.

A dedicated, fixed CPU performance counter within processor 730 may be used for multiplexing the FPGA-specific performance counters defined by the kernels, and those exposed by the end-to-end resources.

The system software stack may also expose a novel interface that allows a programmer to register a kernel with an interface that provides a pointer to a memory region where the FPGA can store performance counters that are being registered and updated within a kernel 706. Alternatively, the registration could specify that normal CPU performance counters will be used to access the monitoring data.

Advantageously, this provides better performance monitoring than may be realized by FPGA simulation alone. A standalone FPGA simulation may not capture the entire picture, including execution on the processor 730, in conjunction with execution of kernel 706 on FPGA 712. Rather, the FPGA simulation tool may simulate only FPGA 712, separate from processor 730. This provides better integration with existing hardware monitoring apparatus exposed by the hardware platform of processor 730, such as port monitor (PMON) counters. Using the present architecture, applications can perform end-to-end monitoring from the composite sled to the FPGA sled, and from the FPGA to other disaggregated resources. Any kernel 706 may register dynamically any performance counter, expose metadata associated with it, and use new or existing PMON capabilities to expose them.

In the example of data center 700, a new hardware interface may also be exposed to the software stack to dynamically discover what data are exposed by each kernel running on an FPGA 712, as well as how it is exposed. Furthermore, the novel logic on FPGA 712 may allow the population of a new set of CPU performance counters using existing PMON methods. Thus, existing tools and applications can be configured to transparently access new capabilities using existing legacy code.

FIG. 8 is a block diagram of a communications model for a data center, which may include SDI functionality according to one or more examples of the present specification.

In this example, the communication model provides end-to-end monitoring elements that provide telemetry data for data center resources that participate in, by way of example:

Compute sled to FPGA communication from the compute sled up to the disaggregated FPGA.

FPGA to other data center resources. For example, an FPGA may be accessing remote storage or remote memory.

Telemetry data generated by the FPGA itself, or by a kernel running on the FPGA and its associated resources. This may include new counters or monitors as described herein.

In this example, application 804 may be running on a compute sled as described in other figures of this specification. Application 804 accesses end-to-end monitoring element 808, which in an example provides the functionality described above.

Application 804 also communicates with kernel 812, which may be running on an FPGA in a resource sled as described above, and other FPGA resources 816.

In the example of FIG. 8, end-to-end monitoring element 808 monitors factors such as local SDI HFI metrics, herein represented as local SDI HFI metrics 0-m, SDI fabric metrics represented herein as SDI fabric metrics 0-n, and end-to-end metrics, which may include overall system performance, which may be related for example to SLAs.

Kernel 812 includes kernel metrics, herein represented as kernel metrics 0 through kernel metric p.

FPGA resources 816 include resource 1 822 through resource k 824, as well as disaggregated resources 826. Resource 1 includes resource metrics, herein represented as resource 1 metric 0 through resource 1 metric q. Resource k includes resource metrics herein labeled resource k metric 0 through resource k metric o. Disaggregated resource 826 includes metrics herein represented as disaggregated resource k metric 0 through disaggregated resource k metric 1 through disaggregated resource k metric o.

Monitoring data collected by a resource may be configured to specify factors such as, by way of nonlimiting example:

How data are consumed. For example, data may be sent to the SDI orchestrator or a point of delivery (PoD) manager, or to a centralized entity (either software or hardware). Data may be sent directly to the compute sled. Data may be polled or pulled by software.

When data are to be sent and updated.

What data are to be stored, such as what sleds are using the particular resource that needs to be monitored.

In some examples, data may be consumed directly from memory by a software stack, by performance counters, or from an SDI entity such as a PoD manager using existing software interfaces.

Figure 9:
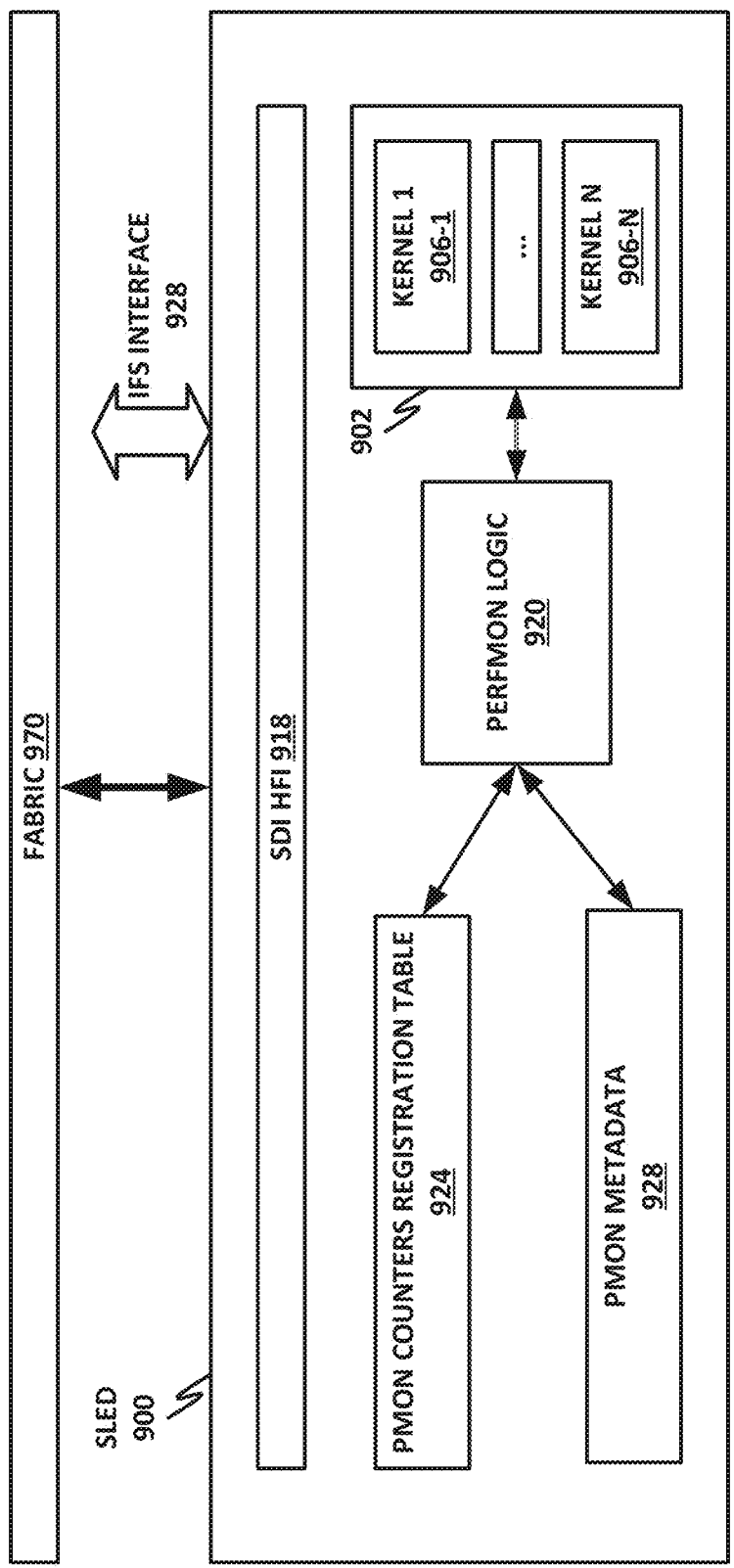
FIG. 9 is a block diagram of selected elements of a resource sled, according to one or more examples of the present specification.

FIG. 9 is a block diagram of selected elements of a resource sled 900 according to one or more examples of the present specification.

In this example, resource sled 900 includes an SDI HFI 918, which communicatively couples resource sled 900 to fabric 970. Resource sled 900 also includes an IFS interface 928, which could be used, for example, to program a resource such as an FPGA on resource sled 900.

In this example, resource sled 900 includes one or more FPGAs 902, running kernels 906-1 through kernel 906-N. Resource sled 900 also includes a performance monitor counter registration table 924, and a table for performance monitoring metadata 928.

Performance monitoring logic 920 may be an FPGA multi-kernel performance monitor logic.

Note that in certain examples, the FPGA architecture may be extended, including interfaces to expose a performance monitoring mechanism to kernels, to allow kernels to dynamically register performance counters as well as their corresponding metadata. The architecture may also provide interfaces that expose mechanisms to the software stack, to discover the new performance counters as well as providing interfaces to access the data stored in the performance counters.

To realize this novel functionality, the system software stack may expose a novel interface that allows a programmer to register a kernel with an interface that provides a pointer to a memory region where the FPGA or other disaggregated resource can store performance counters that are being registered and updated with that kernel.

In one illustrative and nonlimiting example, four novel interfaces are exposed.

1. An interface to register the kernel, as well as metadata regarding how the kernel data may be exposed.

2. An interface used by the kernel code to register every performance counter with its corresponding metadata (i.e., performance counters and PMON counters registration table 924, and metadata and PMON metadata 928.)

3. Interfaces used by the kernel code to update specific performance counters such as in PMON counters registration table 924.

4. An interface used by the application to discover performance counters exposed by a given kernel.

Illustrative examples of these novel interfaces are provided below.

RegisterKernel(Kernel,@PerformanceCounterMemoryRange, UseExistingCounters=1/0)
Register(KernelID,PerformanceCounterID,PerformanceCounterMetadata)
UpdateCounterValue(PerformanceCounterID,Value)
DiscoverPerformanceCounters(KernelID)

In certain examples, the FPGA may also be extended with a novel performance monitoring table, e.g., PMON counters registration table 924, wherein each kernel 906 may register a number of performance counters, as well as metadata associated with those performance counters. PMON counters registration table 924 may be controlled by performance monitor (perfmon) logic 920, to which kernels 906 may register new performance counters, as well as the values for those performance counters once the kernel starts running.

Perfmon logic 920 may, based on metadata and perfmon metadata 928 (for example, update counters every N cycles or on overflow), take responsibility for updating the memory range with new monitoring data. Applications running on the node may access as necessary metadata stored in PMON metadata table 928 to discover which counters are exposed, what they contain, and how they will be updated. Security may also be a consideration, and counters may be exposed with metadata to process requests with corresponding rights.

This architecture may provide a number of novel performance counters. In some examples, these may be fixed performance monitoring counters per kernel, within some examples a maximum number of supported kernels, to expose performance counters exposed by the application. A set of fixed MSRs may also be exposed, to expose metadata of the dynamic counters, so that applications may discover how many performance counters the kernel exposes, what those counters are, and how they are updated.

Perfmon logic 920 may be responsible to fill a set of performance monitoring counters associated with a given kernel 906. Applications may access this performance counter using existing apparatuses that expose performance counters on the node. Advantageously, this can support allowing dynamic exposure to new performance counters. The number and nature of performance counters need not be fixed in silicon as it is in some existing implementations. Thus, the number of fixed performance counters need not change. However, the semantic of each of those counters may depend on the kernel associated to that counter at the time.

The format of performance counter IDs could be, for example, based on the architecture illustrated in FIG. 8, such as an identifier of the kernel, and the number of the performance monitor running on that kernel.

Note that in some examples, the values "N" and "P," representing the maximum number of performance counters, may be fixed in the CPU. When registering a given kernel in the FPGA, the software stack may receive a kernel ID that may be used to discover which performance counters it has access to. On the other hand, to discover the semantics and characteristics of each kernel performance counter, the application may access a set of predefined MSRs that expose the information, similar to what the CPUID does. The format of the MSRs could be:

MSR_KERN1_PMON1, MSR_KERN1_PMON2, . . . ,
   MSR_KERN1_PMONn, . . . , MSR_KERNm_PMONp

The metadata themselves may contain any appropriate metadata. This could include data types such as type of data, information exposed, when it is exposed, and similar. In some examples, a dedicated hardware counter on the processor may be used for multiplexing across multiple events or counters defined by the kernel.

Figure 10:
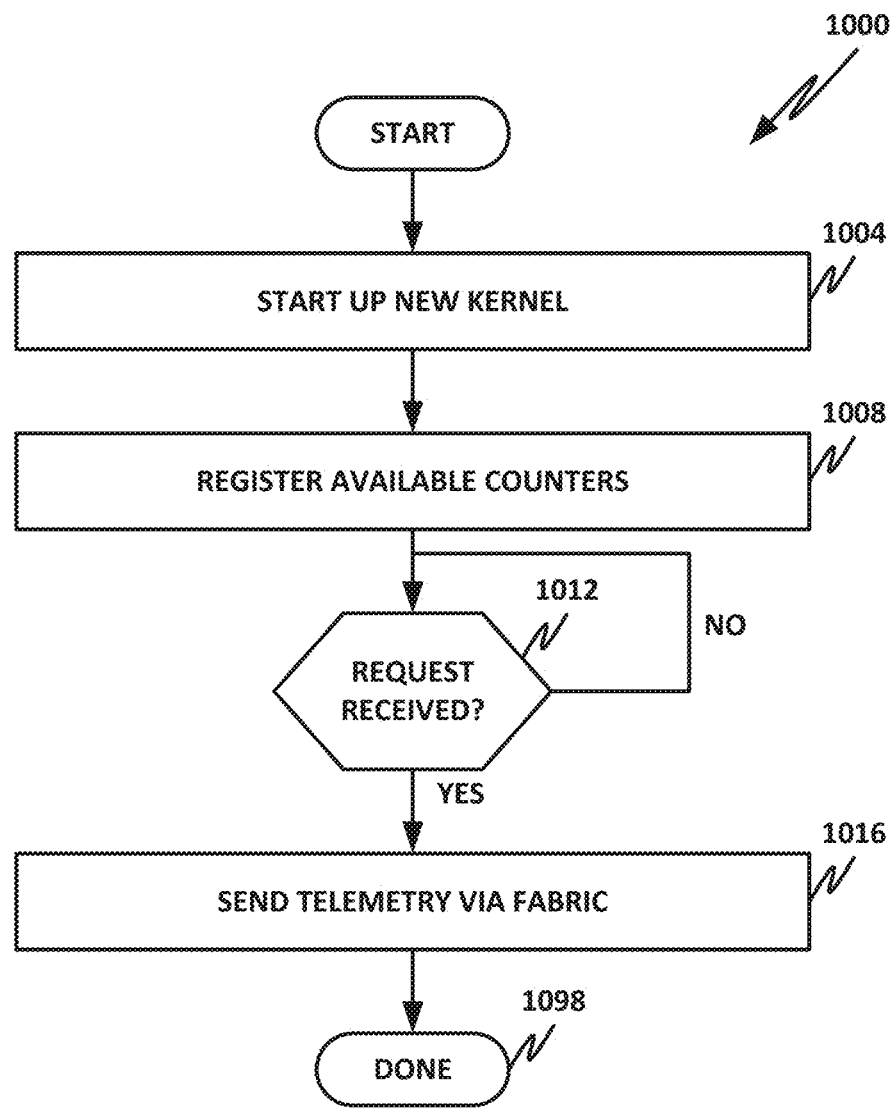
FIG. 10 is a flowchart of a method, according to one or more examples of the present specification.

FIG. 10 is a flowchart of a method 1000 according to one or more examples of the present specification. In certain embodiments, the method of FIG. 10 may be carried out by a disaggregated resource, such as an FPGA.

In example 1004, the disaggregated resource (such as an FPGA) starts up a new kernel.

An example 1008, the disaggregated resource, or perfmon logic on the disaggregated resource, registers available counters. Registration of available counters may include populating a PMON metadata table so that available counters can be discovered. In other examples, counters may be registered to a central authority, such as an SDI orchestrator or other central authority. Registration to a central authority may enable discovery of the telemetry by any node in the data center. In some cases this is desirable, while in other cases it is desirable only to allow resources in the same composite node to access the telemetry data. The selection of a model will depend on design considerations of a particular embodiment.

In decision block 1012, the perfmon logic waits to receive a request for telemetry. As long as no request is received, then the perfmon logic continues waiting.

Once a request is received, then in block 1016, the disaggregated resource may send the requested telemetry via the fabric.

In block 1098, the method is done.

Figure 11:
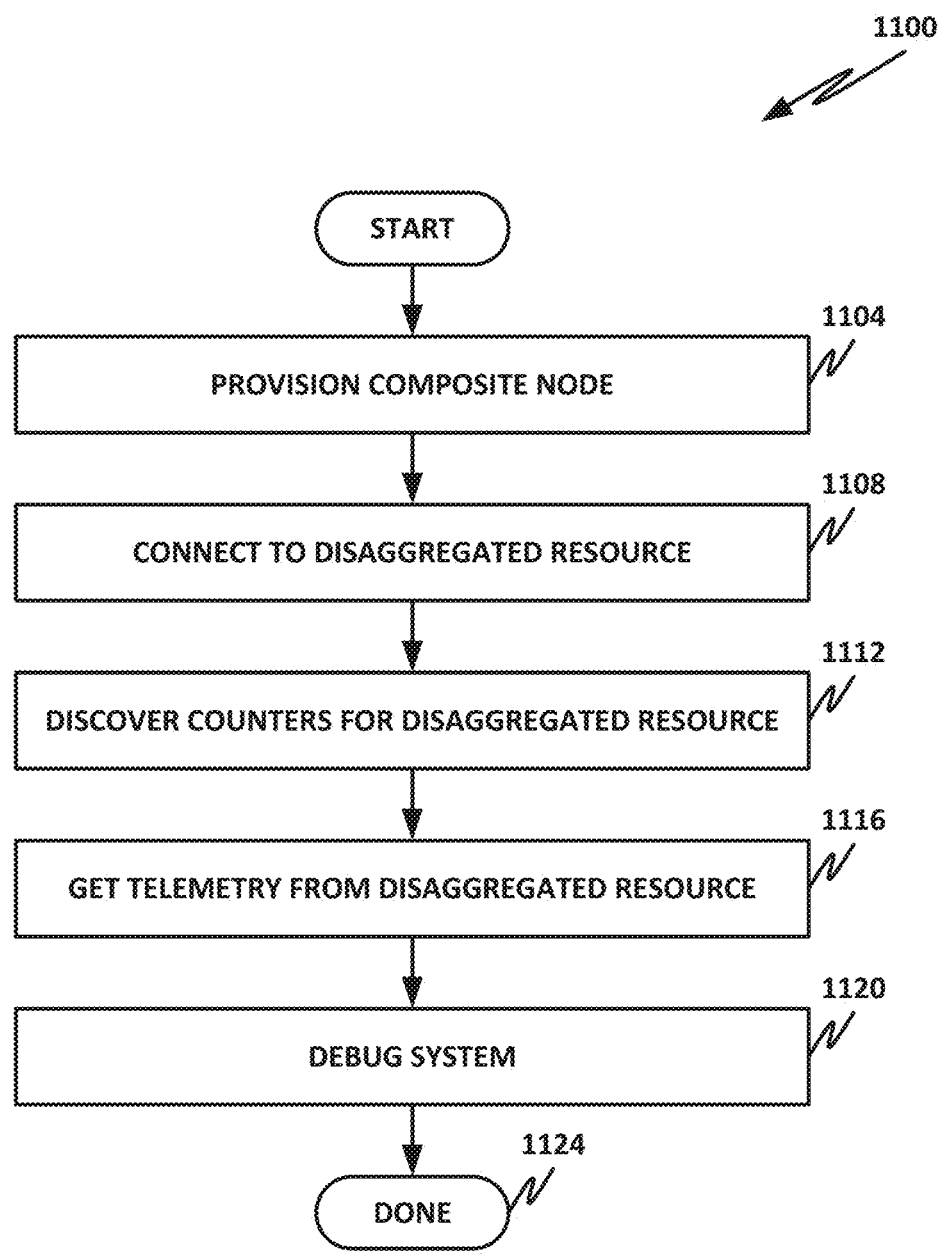
FIG. 11 is a flowchart of a method of performing debugging with telemetry for disaggregated resources, according to one or more examples of the present specification.

FIG. 11 is a flowchart of a method 1100 of performing debugging with telemetry for disaggregated resources according to one or more examples of the present specification.

In block 1104, a central authority such as an SDI orchestrator may provision a composite node, including one or more disaggregated resources.

In block 1108, a compute node, such as a processor on a compute sled, connects to the disaggregated resources.

In block 1112, the compute node discovers counters for the disaggregated resource. Discovery of counters may include push notifications from the disaggregated resource, may include polling the disaggregated resource to determine which counters are available, or otherwise communicating directly with the disaggregated resource. In other embodiments, disaggregated resources may register their telemetry to a central authority such as an SDI orchestrator, in which case discovery of disaggregated resources may occur via the central authority.

In block 1116, the compute node requests from and receives requests and receives from the disaggregated resource the necessary telemetry.

In block 1120, the compute node may use the received telemetry to debug the system. Note that debugging may include not only evaluating the program for correctness, but also evaluating resource usage to ensure that resources do not become a bottleneck in the data center, and that key performance indicators are met.

In block 1124, the method is done.

Figure 12:
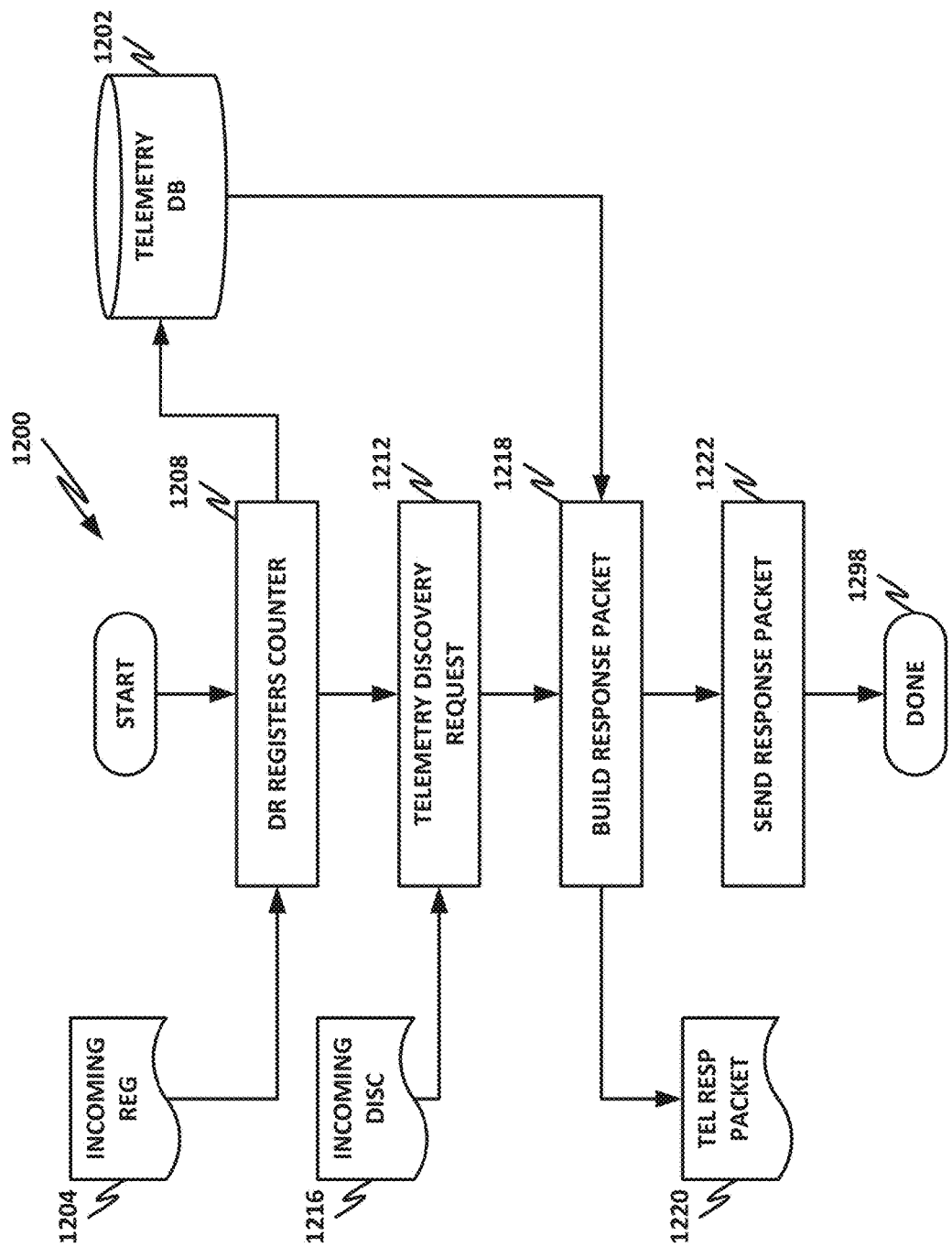
FIG. 12 is a flowchart of a method that may be performed on a central authority, such as an SDI orchestrator, according to one or more examples of the present specification.

FIG. 12 is a flowchart of a method 1200 that may be performed on a central authority, such as an SDI orchestrator, in cases where telemetry data are registered to the central authority.

In this example, the central authority, such as the SDI orchestrator, may include a telemetry database 1202.

In block 1208, the central authority receives an incoming registration 1204, by which a disaggregated resource registers available counters or other telemetry. The central authority stores these in telemetry database 1202.

In block 1212, the central authority may receive a telemetry discover request, via an incoming discover request 1216, which may be received for example from a compute node that accesses the disaggregated resource.

In block 1218, the central authority uses information in telemetry database 1202 to build a response packet containing metadata for the telemetry for the disaggregated resource. This may include information and interfaces for accessing the telemetry from the disaggregated resource. The central authority builds telemetry response packet 1220.

In block 1222, the central authority sends the telemetry response packet 1220 to the requesting compute node.

In block 1298, the method is done.

Note that in certain embodiments, even where telemetry data are centrally registered with a central authority, the central authority need not be directly involved in the exchange of telemetry data. Rather, once the compute node has used a discover request 1216 to discover available telemetry on disaggregated resources, the two nodes may communicate directly to exchange telemetry data. However, this should not be construed to exclude embodiments wherein telemetry data are centrally registered to and stored on the central authority, and wherein the compute node receives the telemetry data from the central authority.

Figure 13:
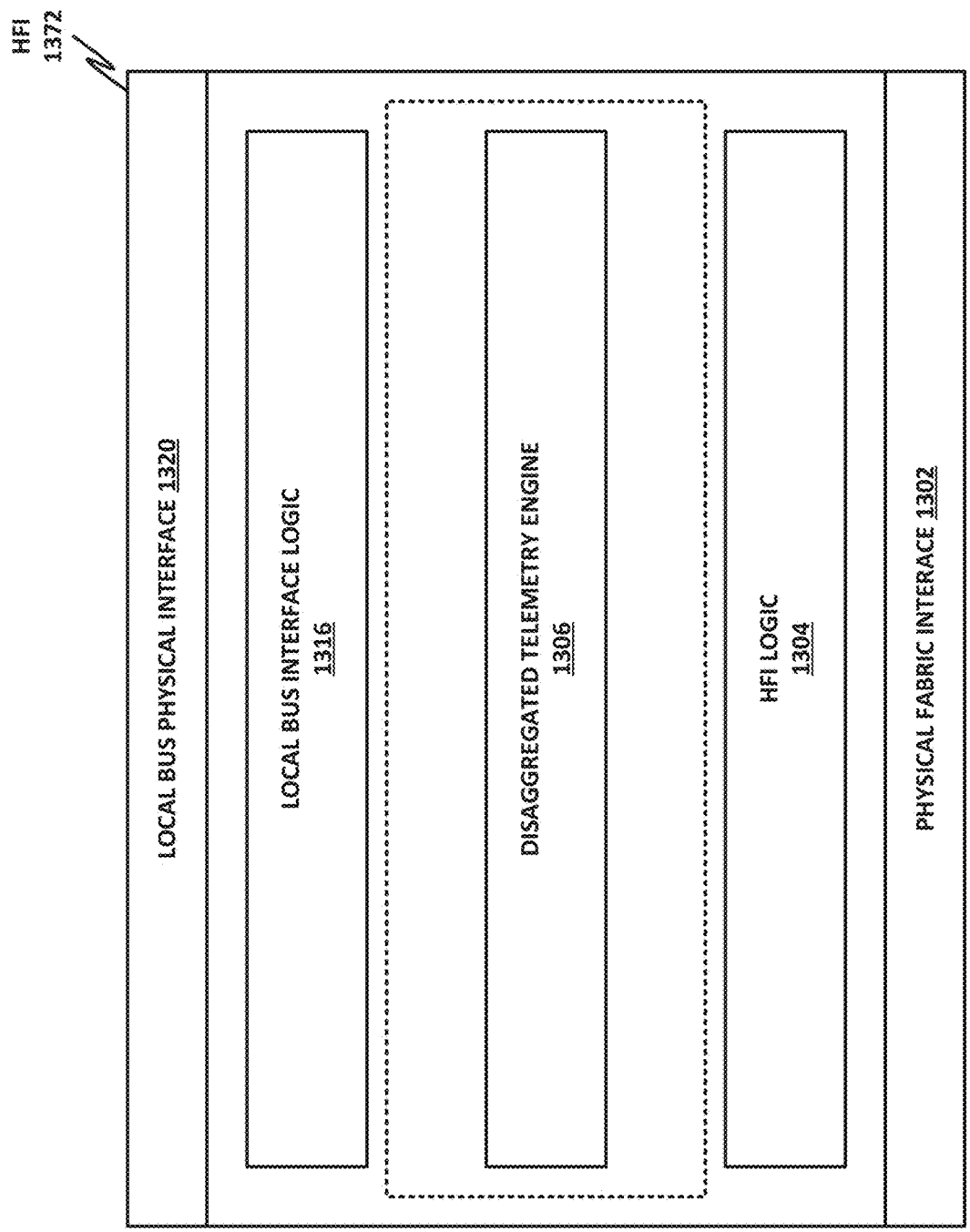
FIG. 13 is a block diagram of an example host fabric interface (HFI) according to one or more examples of the present specification.

FIG. 13 is a block diagram of an example HFI 1372 according to one or more examples of the present specification. This HFI 1372 is provided by way of nonlimiting example only. It should be noted in particular that HFI 1372 may be a separate pluggable card, such as a PCIe card, or it may be tightly integrated and on-die with its host core. Furthermore, while HFI 1372 is disclosed herein as the medium for hosting remote hardware acceleration functions, these functions could just as well be hosted in another part of the machine. For example, a dedicated RHA chip could be provided, which itself could be very much like a hardware accelerator. Functions could be performed on a hardware block integrated into the core, or these functions could be performed in software on the core. Thus, the disclosure of remote hardware acceleration functions on HFI 1372 in this figure should be understood as a nonlimiting and illustrative example only, and the present disclosure should be understood to encompass any suitable hardware or software configuration for realizing remote hardware acceleration.

In this example, HFI 1372 includes two physical interfaces, namely a local bus physical interface 1320 and a physical HFI 1302.

Local bus interface 1320 may provide a physical interface to a local bus on the host, such as a PCIe interface or other local interconnect. Local bus physical interface 1320 is provided as a nonlimiting example, and it should be understood that other interconnect methods are possible. For example, in cases where HFI 1372 is tightly coupled with its accompanying core, local bus physical interface 1320 could be direct, on-die trace lines, or direct copper connections on an integrated circuit board. In other examples, a bus interface other than PCIe could be used.

Physical HFI 1302 provides the physical interconnect to a fabric, such as fabric 170 of FIG. 1 or any of the fabrics disclosed herein. Physical HFI 1302 may be configured to connect HFI 1372 to any suitable fabric.

This communication may be facilitated via HFI logic 1304, which provides circuitry and other logic elements and instructions necessary to provide communication within a coherent domain, and across the fabric with different coherent domains. HFI logic 1304 may also include logic to translate local requests into remote fabric requests.

On the other hand, local bus interface logic 1316 may provide logic for interfacing with the local bus, such as a PCIe bus, or a dedicated copper connection. Alternately, traffic through HFI 1372 may follow a path through local bus physical interface 1320, local bus interface logic 1316, HFI logic 1304, and physical HFI 1302 out to the fabric.

Together, physical bus interface 1302, HFI logic 1304, local bus interface logic 1316, and local bus physical interface 1320 provide circuitry and logic to communicatively couple a host (which may be connected via local bus physical interface 1320) to a fabric (which may be connected via physical fabric interface 1302).

HFI 1372 also includes a disaggregated telemetry engine (DTE) 1306. By way of nonlimiting example, DTE 1372 may be configured, adapted, or operable to receive a notification via the fabric of available telemetry data for a disaggregated accelerator, allocate memory for handling the telemetry data, receive the telemetry data from the disaggregated accelerator, and act on the telemetry data. In various embodiments, DTE 1372 may receive the data according to a "push" model (e.g., the accelerator "pushes" telemetry data out to HFI 1372 as they become available), or via a "pull" model (e.g., HFI 1372 "pulls" telemetry data from the accelerator as they become available). The accelerator may be any resource or device in the data center, including an FPGA, an ASIC, a hardware accelerator, a software accelerator, or similar. The accelerator may include associated resources, such as memory, I/O, or storage by way of nonlimiting example.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

Note also that in certain embodiments, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute any type of instructions associated with the data to achieve the operations detailed herein. Any processor disclosed herein could transform an element or an article (for example, data) from one state or thing to another state or thing. In operation, a storage may store information in any suitable type of tangible, nontransitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate. A nontransitory storage medium herein is expressly intended to include any nontransitory special-purpose or programmable hardware configured to provide the disclosed operations, or to cause a processor to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a host fabric interface (HFI), comprising: first logic to communicatively couple a host to a fabric; and second logic to provide a disaggregated telemetry engine (DTE) to: receive notification via the fabric of available telemetry data for a remote accelerator; allocate memory for handling the telemetry data; and receive the telemetry data from the disaggregated accelerator.

Example 2 includes the HFI of example 1, wherein the telemetry data comprises kernel telemetry data for a kernel of the disaggregated accelerator.

Example 3 includes the HFI of example 1, wherein the telemetry data comprises resource telemetry data.

Example 4 includes the HFI of example 1, wherein the DTE is to receive the telemetry data according to a push model.

Example 5 includes the HFI of example 1, wherein the DTE is to receive the telemetry data according to a pull model.

Example 6 includes the HFI of any of examples 1-5, wherein the telemetry data is FPGA telemetry data.

Example 7 includes a compute node comprising a host hardware platform and the HFI of any of examples 1-5.

Example 8 includes a host fabric interface (HFI), comprising: first circuitry and logic to communicatively couple an accelerator to a fabric; and second circuitry and logic to provide a disaggregated telemetry engine (DTE) to: provide a notification via the fabric of an available performance monitor for the accelerator; retrieve from the accelerator, or from a resource of the accelerator, an instance of performance monitor data for the performance monitor; and send the performance monitor data via the fabric.

Example 9 includes the HFI of example 8, wherein the DTE is to register the performance monitor via the fabric.

Example 10 includes the HFI of example 9, wherein registering the performance monitor comprises registering to a compute node.

Example 11 includes the HFI of example 9, wherein registering the performance monitor comprises registering to a central authority.

Example 12 includes the HFI of example 8, wherein the DTE is to send the performance monitor data according to a push model.

Example 13 includes the HFI of example 8, wherein the DTE is to send the performance monitor data responsive to a pull.

Example 14 includes the HFI of example 8, wherein the performance monitor data comprises resource telemetry data.

Example 15 includes the HFI of any of examples 8-14, wherein the accelerator comprises a field-programmable gate array (FPGA).

Example 16 includes the HFI of example 15, wherein the FPGA comprises an interface to an FPGA kernel to register performance counters to the HFI.

Example 17 includes an accelerator sled comprising an accelerator and the HFI of any of examples 8-16.

Example 18 includes a compute sled, comprising: a host processor; a memory configured to provide a software program; and a host fabric interface (HFI), comprising: first circuitry and logic to communicatively couple the compute sled to a fabric; and second circuitry and logic to provide a disaggregated telemetry engine (DTE) to: receive notification via the fabric of available telemetry data for a disaggregated accelerator; allocate memory for handling the telemetry data; receive the telemetry data from the disaggregated accelerator; and provide data to debug the software program according to the telemetry data.

Example 19 includes the compute sled of example 18, wherein the telemetry data comprises kernel telemetry data for a kernel of the disaggregated accelerator.

Example 20 includes the compute sled of example 18, wherein the telemetry data comprises resource telemetry data.

Example 21 includes the compute sled of example 18, wherein the DTE is to receive the telemetry data according to a push model.

Example 22 includes the compute sled of example 18, wherein the DTE is to receive the telemetry data according to a pull model.

Example 23 includes the compute sled of any of examples 18-22, wherein the accelerator comprises a field-programmable gate array (FPGA).

Example 24 includes a rack comprising the compute sled of any of examples 18-22.

Example 25 includes an accelerator sled, comprising: an accelerator configured to provide an accelerator kernel; and a host fabric interface (HFI), comprising: first circuitry and logic to communicatively couple the accelerator to a fabric; and second circuitry and logic to provide a disaggregated telemetry engine (DTE) to: provide a notification via the fabric of an available performance monitor for the accelerator; retrieve from the accelerator, or from a resource of the accelerator, an instance of performance monitor data for the performance monitor; and send the performance monitor data via the fabric.

Example 26 includes the accelerator sled of example 25, wherein the DTE is to register the performance monitor via the fabric.

Example 27 includes the accelerator sled of example 26, wherein registering the performance monitor comprises registering to a compute node.

Example 28 includes the accelerator sled of example 25, wherein registering the performance monitor comprises registering to a central authority.

Example 29 includes the accelerator sled of example 25, wherein the DTE is to send the performance monitor data according to a push model.

Example 30 includes the accelerator sled of example 25, wherein the DTE is to send the performance monitor data responsive to a pull.

Example 31 includes the accelerator sled of example 25, wherein the performance monitor data comprises resource telemetry data.

Example 32 includes the accelerator sled of any of examples 25-31, wherein the accelerator comprises a field-programmable gate array (FPGA).

Example 33 includes the accelerator sled of example 25, wherein the FPGA comprises an interface to an FPGA kernel to register performance counters to the HFI.

Example 34 includes a data center rack comprising the accelerator sled of any of examples 25-31.

Example 35 includes a method of providing disaggregated telemetry for a disaggregated accelerator, comprising: communicatively coupling a host to a fabric; receiving a notification via the fabric of available telemetry data for the disaggregated accelerator; allocating memory for handling the telemetry data; receiving the telemetry data from the disaggregated accelerator; and acting on the telemetry data.

Example 36 includes the method of example 35, wherein the telemetry data comprises kernel telemetry data for a kernel of the disaggregated accelerator.

Example 37 includes the method of example 35, wherein the telemetry data comprises resource telemetry data.

Example 38 includes the method of example 35, further comprising receiving the telemetry data according to a push model.

Example 39 includes the method of example 35, further comprising the telemetry data according to a pull model.

Example 40 includes the method of any of examples 35-39, wherein the accelerator comprises a field-programmable gate array (FPGA).

Example 41 includes a compute node comprising means for providing the method of any of examples 35-40.

Example 42 includes a compute sled comprising the compute node of example 41.

Example 43 includes a data center rack comprising the compute sled of example 42.

Example 44 includes a method of providing disaggregated telemetry for a disaggregated accelerator, comprising: communicatively coupling an accelerator to a fabric; providing a notification via the fabric of an available performance monitor for the accelerator; retrieving from the accelerator, or from a resource of the accelerator, an instance of performance monitor data for the performance monitor; and sending the performance monitor data via the fabric.

Example 45 includes the method of example 44, further comprising registering the performance monitor via the fabric.

Example 46 includes the method of example 45, wherein registering the performance monitor comprises registering to a compute node.

Example 47 includes the method of example 45, wherein registering the performance monitor comprises registering to a central authority.

Example 48 includes the method of example 44, further comprising sending the performance monitor data according to a push model.

Example 49 includes the method of example 44, further comprising sending the performance monitor data responsive to a pull.

Example 50 includes the method of example 44, wherein the performance monitor data comprises resource telemetry data.

Example 51 includes the method of any of examples 44-50, wherein the accelerator comprises a field-programmable gate array (FPGA).

Example 52 includes the method of example 51, wherein the FPGA comprises an interface to an FPGA kernel to register performance counters to the HFI.

Example 53 includes an accelerator node comprising means for performing the method of any of examples 44-52.

Example 54 includes an accelerator sled comprising the accelerator node of example 53.

Example 55 includes a data center rack comprising the accelerator sled of example 54.

What is claimed is:

1. A peripheral component interconnect express (PCIe) host fabric interface (HFI), comprising:
   a PCIe interface to communicatively couple to a PCIe bus of a host;
   a fabric interface circuit to communicatively couple the host to a network fabric; and
   circuitry to:
      allocate a field-programmable gate array (FPGA) kernel to a remote FPGA accelerator to provide a disaggregated compute function;
      receive notification via the network fabric of available performance telemetry data for the remote FPGA accelerator;
      allocate memory for handling telemetry data;
      receive the telemetry data from the remote FPGA accelerator into the allocated memory; and
      responsive to the telemetry data, allocate or deallocate an instance of the remote FPGA accelerator.

2. The HFI of claim 1, wherein the telemetry data comprises kernel telemetry data for a kernel of the remote FPGA accelerator.

3. The HFI of claim 1, wherein the telemetry data comprises resource telemetry data.

4. The HFI of claim 1, wherein the circuit is to receive the telemetry data according to a push model.

5. The HFI of claim 1, wherein the circuit is to receive the telemetry data according to a pull model.

6. The HFI of claim 1, wherein the telemetry data is FPGA telemetry data.

7. A compute node comprising a host hardware platform and the HFI of claim 1.

8. A peripheral component interconnect express (PCIe) host fabric interface (HFI), comprising:
   a PCIe interface to communicatively couple to a PCIe bus of a host;
   a fabric interface circuit to communicatively couple a remote FPGA accelerator to a network fabric; and
   circuitry to:
      allocate a field-programmable gate array (FPGA) kernel to the remote FPGA accelerator to provide a disaggregated compute function;
      provide a notification via the network fabric of an available performance monitor for the remote FPGA accelerator;
      retrieve from the remote FPGA accelerator, or from a resource of the remote FPGA accelerator, an instance of performance monitor data for the performance monitor;
      send the performance monitor data via the network fabric; and
      responsive to telemetry data, allocate or deallocate an instance of the remote FPGA accelerator.

9. The HFI of claim 8, wherein the circuit is to register the performance monitor via the network fabric.

10. The HFI of claim 9, wherein registering the performance monitor comprises registering to a compute node.

11. The HFI of claim 9, wherein registering the performance monitor comprises registering to a central authority.

12. The HFI of claim 8, wherein the circuit is to send the performance monitor data according to a push model.

13. The HFI of claim 8, wherein the circuit is to send the performance monitor data responsive to a pull.

14. The HFI of claim 8, wherein the performance monitor data comprises resource telemetry data.

15. The HFI of claim 8, wherein the FPGA comprises an interface to an FPGA kernel to register performance counters to the HFI.

16. An accelerator sled comprising an accelerator and the HFI of claim 8.

17. A compute sled, comprising:
    a host processor;
    a memory configured to provide a software program; and
    a peripheral component interconnect express (PCIe) host fabric interface (HFI), comprising:
       a fabric interface circuit to communicatively couple the compute sled to a network fabric; and
       circuitry to:
          allocate a field-programmable gate array (FPGA) kernel to a remote FPGA accelerator to provide a disaggregated compute function;
          receive notification via the network fabric of available performance telemetry data for the remote FPGA accelerator;
          allocate memory for handling telemetry data;
          receive the telemetry data from the remote FPGA accelerator into the allocated memory;
          responsive to the telemetry data, allocate or deallocate an instance of the remote FPGA accelerator; and
          provide data to debug the software program according to the telemetry data.

18. The compute sled of claim 17, wherein the telemetry data comprises kernel telemetry data for a kernel of the remote FPGA accelerator.

19. The compute sled of claim 17, wherein the telemetry data comprises resource telemetry data.

20. The compute sled of claim 17, wherein the telemetry data comprises a custom-defined kernel-specific event for a kernel of the remote FPGA accelerator.

21. The compute sled of claim 20, wherein the custom-defined kernel-specific event is pre-registered.

22. A rack comprising the compute sled of claim 17.

23. A method of providing disaggregated telemetry for a remote field-programmable gate array (FPGA) accelerator of a disaggregated compute function, comprising:
    communicatively coupling a peripheral component interconnect express (PCIe) host to a network fabric;
    allocating an FPGA kernel to the remote FPGA accelerator to provide the disaggregated compute function;
    receiving a notification via the network fabric of available performance telemetry data for the remote FPGA accelerator;
    allocating memory for handling telemetry data;
    receiving the telemetry data from the remote FPGA accelerator into the allocated memory; and
    responsive to the telemetry data, allocating or deallocating an instance of the remote FPGA accelerator acting on the telemetry data.

24. The method of claim 23, wherein the telemetry data comprises kernel telemetry data for a kernel of the remote FPGA accelerator.

25. The method of claim 23, wherein the telemetry data comprises resource telemetry data.

\* \* \* \* \*